US006521381B1

(12) United States Patent
Vyas et al.

(10) Patent No.: US 6,521,381 B1
(45) Date of Patent: Feb. 18, 2003

(54) ELECTRODE AND MEMBRANE-ELECTRODE ASSEMBLIES FOR ELECTROCHEMICAL CELLS

(75) Inventors: Gayatri Vyas, Rochester Hills, MI (US); Swathy Swathirajan, West Bloomfield, MI (US); Yang T. Cheng, Rochester Hills, MI (US); Youssef M. Mikhail, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/268,827

(22) Filed: Mar. 16, 1999

(51) Int. Cl.[7] .......................... H01M 4/62; H01M 6/00; H01M 4/64; H01M 4/66
(52) U.S. Cl. ...................... 429/232; 29/623.5; 429/233; 429/245
(58) Field of Search .......................... 29/623.5; 429/33, 429/41, 42, 232, 233, 245

(56) References Cited

U.S. PATENT DOCUMENTS

| | | | |
|---|---|---|---|
| 4,876,115 A | | 10/1989 | Raistrick .................... 427/115 |
| 5,211,984 A | | 5/1993 | Wilson ....................... 427/115 |
| 5,234,777 A | | 8/1993 | Wilson ......................... 429/33 |
| 5,272,017 A | | 12/1993 | Swathirajan et al. .......... 429/33 |
| 5,316,871 A | | 5/1994 | Swathirajan et al. .......... 429/33 |
| 5,403,680 A | * | 4/1995 | Otagawa et al. ............. 429/213 |
| 5,431,800 A | | 7/1995 | Kirchhoff et al. ........... 204/290 |
| 5,436,091 A | * | 7/1995 | Shackle et al. .............. 429/192 |
| 5,523,179 A | * | 6/1996 | Chu ............................ 429/104 |
| 5,624,718 A | | 4/1997 | Dearnaley ................... 427/530 |
| 5,716,422 A | * | 2/1998 | Muffoletto et al. ......... 29/623.5 |
| 6,117,593 A | * | 9/2000 | Stachoviak et al. ......... 429/242 |

FOREIGN PATENT DOCUMENTS

DE    195 48 422 A1    9/1997

OTHER PUBLICATIONS

M.K. Debe and R.J. Poirier, "Postdeposition Growth of a Uniquely Nanostructured Organic Film by Vacuum Annealing", *J. Vac. Sci. Technol. A* 12(4), Jul./Aug. 1994, pp. 2017–2021.

M.K. Debe and A.R. Drube, "Structural Characteristics of a Uniquely Nanostructured Organic Thin Film", *J. Vac. Sci. Technol. B* 13(3), May/Jun. 1995, pp. 1236–1240.

* cited by examiner

*Primary Examiner*—Wayne A. Langel
*Assistant Examiner*—Jonas N. Strickland
(74) *Attorney, Agent, or Firm*—Cary W. Brooks

(57) ABSTRACT

An electrode structure for an electrochemical cell is formed by forming a mixture comprising proton-conductive material and carbon particles, applying the mixture to a current collector sheet to form a film, and dispersing a catalyst in the form of metallic polycrystals in a thin layer on the exposed surface of the film. This method produces an electrode having significantly increased catalyst utilization, dramatic reduction of catalyst loading, and which is consequently less expensive to produce than electrodes produced by prior art methods. A combination electrolyte and electrode structure for an electrochemical cell is produced by hot-pressing an electrode of the above-described composition into contact with a proton-conductive polymer electrolyte membrane.

13 Claims, 5 Drawing Sheets

ELECTRODE AND MEMBRANE-ELECTRODE ASSEMBLIES FOR ELECTROCHEMICAL CELLS

FIELD OF THE INVENTION

This invention relates to electrodes and combination membrane and electrode assemblies for use with electrochemical cells.

BACKGROUND OF THE INVENTION

Electrochemical cells are desirable for various applications, particularly when operated as fuel cells. Fuel cells have been proposed for many applications including electrical vehicular power plants to replace internal combustion engines. One fuel cell design uses a solid polymer electrolyte (SPE) membrane or proton exchange membrane (PEM), to provide ion exchange between the anode and cathode. Gaseous and liquid fuels are useable within fuel cells. Examples include hydrogen and methanol, and hydrogen is favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. A typical fuel cell is described in U.S. Pat. Nos. 5,272,017 and 5,316,871 (Swathirajan et al.).

Important aspects of a fuel cell include reaction surfaces where electrochemical reactions take place, catalysts which catalyze such reaction, ion conductive media, and mass transport media. The cost of power produced by a fuel cell is in part dependent on the cost of the catalyst. The cost of power produced by a fuel cell is significantly greater than competitive power generation alternatives, partly because of relatively poor utilization of precious metal catalysts in conventional electrodes. However, power produced from hydrogen-based fuel cells is desirable because hydrogen is environmentally acceptable and hydrogen fuel cells are efficient. Therefore, it is desirable to improve the catalyst utilization in fuel cell assemblies to render fuel cells more attractive for power generation.

SUMMARY OF THE INVENTION

In one aspect there is provided an electrode structure comprising a current collector sheet, a film comprising a mixture of proton conductive material and carbon particles, the film having a first surface adhered to the current collector sheet, and metallic polycrystals supported on and dispersed on a second surface of the film.

In another aspect there is provided a combination electrolyte and electrode structure for an electrochemical cell comprising a proton-conductive polymer electrolyte membrane and first and second electrodes adhered to opposite surfaces of the membrane. At least one of the electrodes has a layer made up of carbon particles dispersed in a proton conductive material, and metallic polycrystals are dispersed on the layer so as to be facing and at least partially embedded in the membrane. In the preferred embodiment, the carbon particles have a mean particle size in the range of about 35 to about 50 nanometers, and the metallic polycrystals are platinum. The electrolyte membrane and the proton conductive material preferably each comprise a copolymer of tetrafluoroethylene and perfluorinated monomers containing sulfonic acid groups.

In one embodiment there is provided a method of making the improved electrode structure described above for use in an electrochemical cell. The electrode is produced by forming a mixture comprising proton-conductive material and carbon particles, applying the mixture to a current collector sheet to form a film, and dispersing a catalyst in the form of metallic polycrystals on the exposed surface of the film. This method produces an electrode having significantly increased catalyst utilization, dramatic reduction of catalyst loading, and which is consequently less expensive to produce than electrodes produced by prior art methods.

In a preferred embodiment, the film is preferably prepared by mixing the proton-conductive material and carbon particles with a solvent, spreading the mixture on the current collector sheet, and subsequently evaporating the solvent. The polycrystals are then deposited on the film by a physical vapor deposition process such as electron beam evaporation. The physical vapor deposition process allows the catalyst to be deposited on the electrode film without subjecting the film to high temperatures which would degrade or destroy the proton-conductive material. The end result is the catalyst localized in an ultra-thin layer in intimate contact with the film. The resulting film is preferably hot-pressed onto the current collector sheet in order to insure proper adhesion.

There is also provided a method of making a combination electrolyte and electrode structure for an electrochemical cell having an electrolyte membrane of solid polymer proton-conductive material and first and second electrodes disposed on either side of the electrolyte membrane, at least one of the electrodes being formed by applying a mixture comprising proton-conductive material and carbon particles onto a current collector sheet to form a film which adheres to the sheet, and forming dispersed metallic polycrystals on the surface of the film. The electrode produced in this method is then placed on a first surface of the electrolyte membrane such that the metallic polycrystals face the membrane. The second electrode is placed on the opposite surface of the membrane and the resulting structure is heated and compressed to adhere the electrodes to the membrane. In a preferred embodiment of the invention method the electrodes are adhered to the membrane by subjecting the assembly to a compressive load of from about 250 to about 1000 pounds per square inch, and a temperature of from about 280° F. to about 320° F., and maintaining these conditions for about 1 to about 5 minutes. These conditions have been found to result in the metallic polycrystals becoming at least partially embedded in the membrane, thereby providing a continuous path for protons to the catalyst site where reaction occurs.

As can be seen from the description of the electrode, membrane electrode assembly, and the fuel cell system described above, the invention provides improved catalyst utilization and reduced catalyst loading.

It is an object of the invention to provide new electrodes and new membrane electrode assemblies. Another object is to provide a method for preparing the electrodes and assemblies containing the improved electrodes. Advantageously the membrane/electrode assembly of the invention provides relatively high power output with unexpectedly low catalyst loading.

These and other objects, features and advantages will become apparent from the following description of the preferred embodiments, claims, and accompanying drawings.

DETAILED DESCRIPTION OF THE PREFERRED EMBODIMENTS

Figure 1:
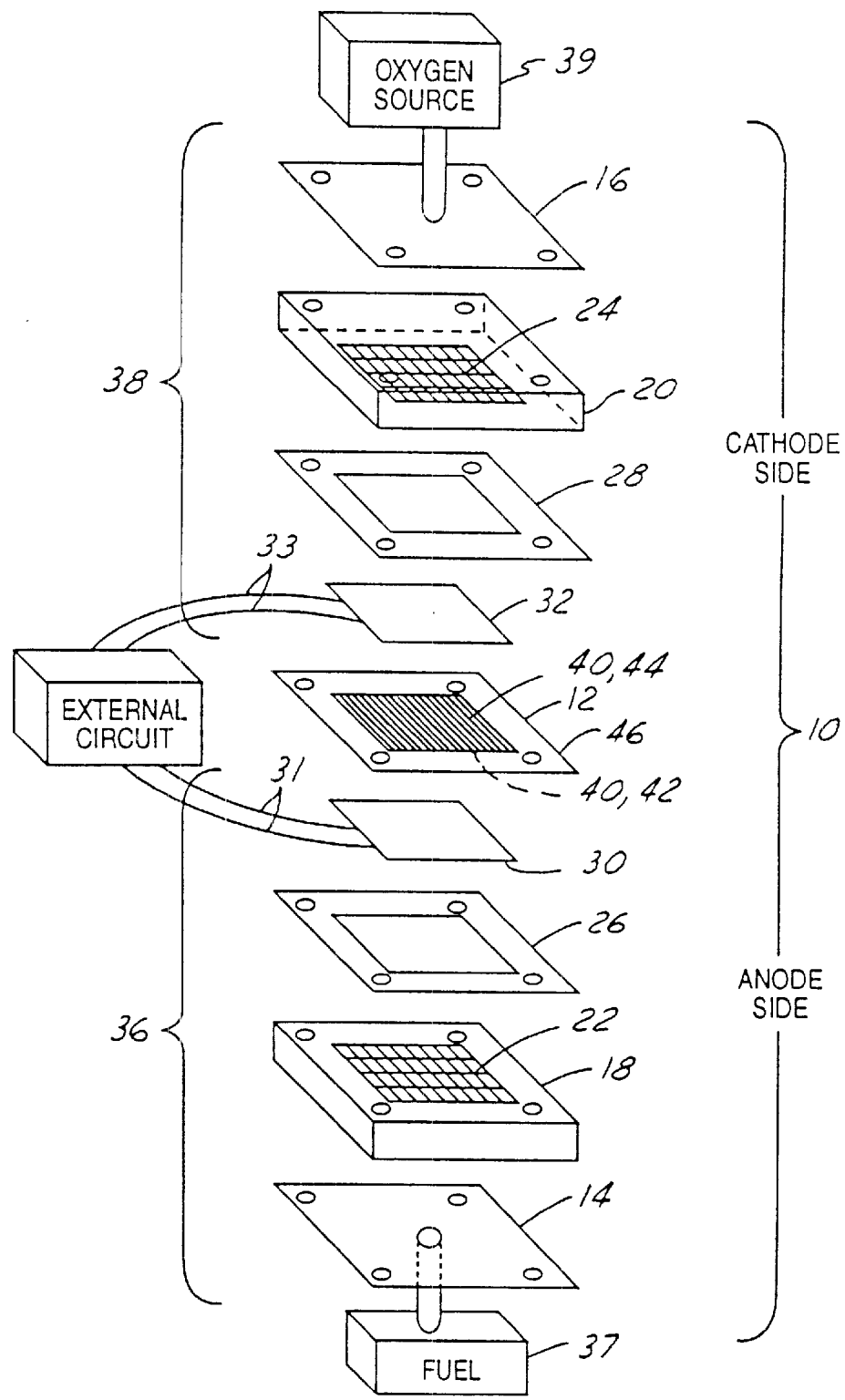
FIG. 1 is a schematic view of an unassembled electrochemical fuel cell having an electrode and a combination membrane and electrode assembly according to the invention.

Referring to FIG. 1, an electrochemical cell 10 with a combination membrane electrolyte and electrode assembly (MEA) 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14, 16, graphite blocks 18, 20 with openings 22, 24 to facilitate gas distribution, gaskets 26, 28, carbon sheet current collectors 30, 32 with respective connections 31, 33 and the membrane electrolyte and electrode assembly (MEA) 12. The two sets of graphite blocks, gaskets, and current collectors namely 18, 26, 30 and 20, 28, 32 are each referred to as respective gas and current transport means 36, 38. Anode connection 31 and cathode connection 33 are used to interconnect with an external circuit which may include other fuel cells.

Electrochemical fuel cell 10 operates with gaseous reactants, one of which is a fuel supplied from fuel source 37, and another is an oxidizer supplied from source 39. The gases from sources 37, 39 diffuse through respective gas and current transport means 36 and 38 to opposite sides of the MEA 12.

Figure 2:
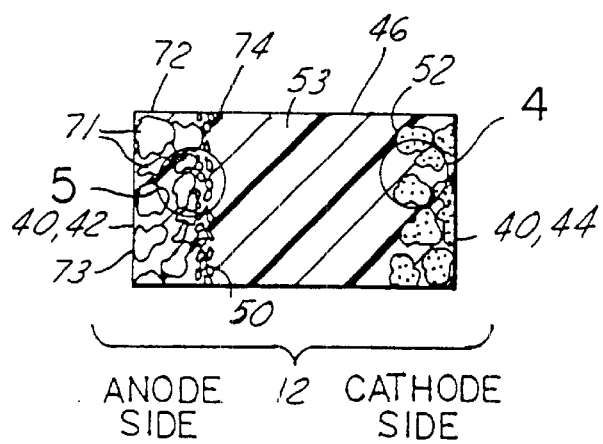
FIG. 2 is a pictorial illustration of a cross-section of a membrane electrode assembly according to the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. The electrodes of the invention provide more effective proton transfer by embedding the electrode into the ionomer membrane to provide essentially continuous polymeric contact for such proton transfer. Accordingly, the MEA 12 of cell 10 has membrane 46 with spaced apart first and second opposed surfaces 50, 52, a thickness or an intermediate membrane region 53 between surfaces 50, 52. Respective electrodes 40, namely anode 42 and cathode 44 are well adhered to membrane 46, at a corresponding one of the surfaces 50, 52.

In one embodiment, respective electrodes 40 (anode 42, cathode 44) further comprise respective first and second Teflonated (polytetrafluoroethylene coated, impregnated) graphite sheets 80, 82, at respective sides of membrane 46.

(FIG. 3) The anode active material is disposed between the first surface 50 of the membrane and the first sheet 80; the cathode active material is disposed between the second surface 52 and the second sheet 82. Each Teflonated sheet 80, 82 is about 7.5 to 13 mils thick.

SPE Membrane

The solid polymer electrolyte (SPE) membrane 46, of the present invention is well known in the art as an ion conductive material. Such SPE membranes are also referred to as proton exchange membranes (PEM). Typical SPE membranes are described in U.S. Pat. Nos. 4,272,353, 3,134,697, and 5,211,984.

The SPE membranes or sheets are ion exchange resin membranes. The resins include ionic groups in their polymeric structure; one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. Dupont de Nemours & Co., under the trade designation Nafion®. Another was developed by Dow Chemical. Such proton conductive membranes may be characterized by monomers of the structures $CF_2=CFOCF_2CF_2SO_3H$, $CF_2=CFOCF_2CF(CF_3)OCF_2SO_3H$, and $—CF_2CF_2CF(ORX)CF_2CF_2—$, where x is $SO_3H$ or $CO_2H$. Nafion® is a fluoropolymer, and more specifically, a copolymer which comprises perfluorinated carboxylic or sulfonic acid monomeric units. Nafion® polymers and polymer membranes are Nafion® polymers prepared from copolymers of tetrafluoroethylene and perfluorinated monomers containing sulfonic or carboxylic acid groups. The perfluorinated sulfonic copolymer is preferred for the invention.

In the electrochemical fuel cell 10 exemplified by the invention, the membrane 46 is a cation permeable, proton conductive membrane, having H+ ions as the mobile ion; the fuel gas is hydrogen (or reformate) and the oxidant is oxygen or air. The overall cell reaction is the oxidation of hydrogen to water and the respective reactions at the anode 42 and cathode 44, are $H_2=2H++2e$ (anode) and $½ O_2+2H^++2e=H_2O$ (cathode).

Since hydrogen is used as the fuel gas, the product of the overall cell reaction is water. Typically, the product water is rejected at the cathode 44 which is the electrode 40 on the oxygen side. Typically, water then escapes by simple flow or by evaporation. However, means may be provided if desired, for collecting the water as it is formed and carrying it away from the cell.

Water management in the cell is important to the successful long-term operation of the electrochemical fuel cell. Water management techniques and cell designs related thereto are described in U.S. Pat. No. 5,272,017 ('017) and U.S. Pat. No. 5,316,871 ('871), each incorporated herein by reference in its entirety. Although water management is an important aspect for fuel cell operation, the present invention is directed to the critical feature of effective electrode utilization. Another important aspect to successful long-term operation of the fuel cell pertains to effective proton transfer between electrodes and the membrane. This aspect is also described in the '017 and '871 patents, each incorporated herein by reference. As described therein, effective proton transfer is at least in part achieved by providing an essentially continuous path of polymeric proton conducting material between the electrodes and the membrane by means described therein.

Electrodes

The electrodes of the invention comprise a current collector and electrode active material which engages in cell reactions. Electrochemical reactions in a fuel cell occur in an interface region among the proton conductive ionomer, catalyst, electron-conducting carbon, and the gaseous reactant. Thus, for good catalyst utilization, the electrode should be designed so that the catalyst sites are in intimate contact with the proton exchange membrane, the gaseous reactant, and the electron-conducting carbon.

Figure 4:
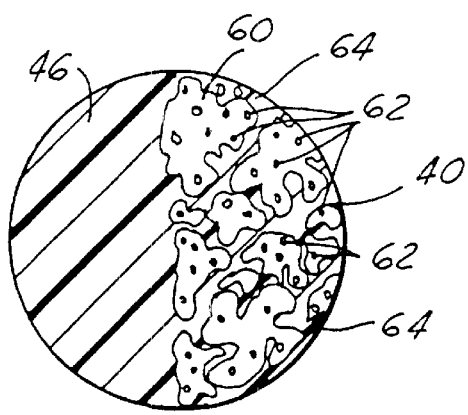
FIG. 4 is a pictorial illustration showing a magnified view of a portion of the cathode side of FIG. 2.

The cathode of the invention is made by conventional methods as described in U.S. Pat. Nos. 5,272,017 and 5,316,871 incorporated herein above by reference. In such configuration catalyzed carbon particles are prepared and then combined with the proton conductive binder in solution with a casting solvent. The solution is applied to a Teflonated graphite sheet 82, the casting solvent is evaporated and the remaining layer comprising catalyzed carbon particles and binder is then brought into contact with, and hot-pressed to, the membrane. Here the catalyzed carbon particles 60 are in intimate contact with and adhered to the membrane 46. As described herein, preferably some portion of the catalyzed carbon particles are at least partially embedded in membrane 46. FIG. 4 is a pictorial illustration showing the magnified view of the cathode 44 having catalyzed carbon particles 60. Here the cathode is clearly shown to contain finely divided carbon particles 60 with very finely divided catalytic particles 62 carried thereon. A proton conductive material 64 is intermingled with particles.

Figure 5:
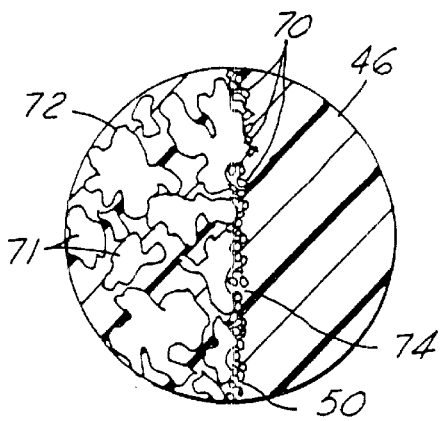
FIG. 5 is a pictorial illustration showing a magnified view of a portion of the anode side of FIG. 2.

The new electrode configuration of the invention is described herein for use as an anode, but is not limited thereby. It is thought to be useable for either an anode or a cathode, and is here demonstrated to be particularly advantageous when used as an anode. The electrode of the invention comprises, the catalyst 70 localized in an ultra-thin layer in intimate contact with the carbon particles 71, carbon current collector sheet 80, and proton conductive material of the electrode. The localized layer of catalyst 70 is also in intimate contact with the proton conductive material of the membrane (FIG. 5). The electrode structure of the invention comprises a current collector sheet 80 and a film 72 adhered to the sheet 80. The film comprises the ionomer (proton-conductive material) and carbon particles 71 intermingled with the proton-conductive material. The first surface 73 of the film is adhered to a surface of the current collector sheet 80. Catalytic polycrystals 70 are supported on and dispersed on the second surface 74 of the film. The polycrystals 70 are preferably metallic, metals or alloys. Most preferred are noble metal catalysts such as platinum (Pt) and palladium (Pd). In addition, other relatively stable metals can be used for alloying such as titanium, ruthenium, rhodium, tungsten, tin or molybdenum. The alloying materials are mainly added to improve the CO tolerance of the anode when the fuel cell is operating on reformate fuels.

The invention provides a new method for forming dispersed microscopic catalytic particles on a high surface area support. Physical vapor deposition means are used in order to provide the desired particle size and in order to deposit the catalytic material onto a surface of the film without changing the essential character of the catalytic material during deposition. Physical vapor deposition is in contrast to processes such as chemical vapor deposition where a decomposition product of a compound provides the catalytic material. In the present invention, chemical vapor deposition means are not desired since the relatively high temperature for decomposition would destroy the physical character of, or decompose, the proton-conductive ionomer. Therefore, deposition means are used which deposits a material without changing its physical characteristic, and at a temperature which does not degrade the components of the electrode film 72. Physical vapor deposition methods include, for example, evaporation, sputtering, sublimation, or other equivalent means. Physical vapor deposition is a preferred method to localize the catalyst in the ultra-thin layer and to disperse the catalyst on the high surface area carbon/ionomer layer. The carbon particle/ionomer layer is applied to the current collector sheet by conventional means such as spraying, brushing, doctor blading, or other conventional coating means onto the current collector. Then, the catalyst is deposited on the applied carbon/ionomer layer preferably by physical vapor deposition. The end result is the catalyst localized in an ultra-thin layer in intimate contact with the carbon/ionomer supported on the current collector sheet and in intimate contact with the surface of the membrane when the membrane electrode assembly is prepared. The membrane electrode assembly is prepared by applying each of the electrodes to a respective surface of the membrane and then hot-pressing at a temperature and compressive load sufficient to adhere the electrodes to the membrane. Preferably at least a portion of the polycrystals are at least partially embedded in the membrane which becomes softened during the high temperature hot-pressing.

More specifically, the active material of the anode 42 is applied to Teflonated graphite sheet 80. Then, the anode active material side carried on sheet 80 is contacted with the first surface 50 of the membrane 46. The active material of the cathode 44 on sheet 82 is contacted with second surface 52 of the membrane 46. The applied sheets 80, 82 are hot-pressed to the membrane while being heated for a time and at a temperature and compressive load sufficient to soften the membrane 46 and at least partially embed at least a portion of the particles 60, 70, in the membrane to thereby form the first and second electrodes 42, 44. The embedded or inset particles 60, 70 are at least partially set in respective surfaces of the membrane although they may not be totally encompassed by the membrane or disposed below its surface.

The step of heating while pressing is conducted at about 250 to about 1000 pounds per square inch compressive load for about one to about five minutes, and at a temperature of about 280° F. (130° C.) to about 320° F. (160° C.). It has been found that a compressive load of about 500 pounds per square inch for about 1 to about 2 minutes at a temperature of about 300° F. (about 150° C.) is effective. The compressive load may vary with time. That is, less load and longer times may be used and the converse also applies.

The embedding of electrodes into the membrane under pressure, provides for a continuous path of proton conductive material from one side of the membrane electrode assembly to the other. The intimate intermingling of proton conductive material with catalyst and carbon particles provides a continuous path for protons to the catalyst site where reaction occurs. The method also achieves a relative peak distribution of catalytic particles adjacent the membrane at each electrode.

Preferably the proton conductive material and the catalytic and carbon particles forming each electrode are in a proportion based on 100 parts, of 30 to about 70 parts proton conductive material and the balance being catalytic carbon particles. And, the platinum and carbon particles are in a proportion based on 100 parts by weight of up to about 20 parts platinum and the balance being carbon particles. By the method of the invention less than 2 parts catalyst is used and the balance carbon.

The membrane electrode assembly of the invention advantageously produces required power output at a very low catalyst loading of less than about 0.015 milligrams per $cm^2$ of electrode surface area. Further, good results are possible with the Pt loading of one electrode being less than that of the other, so that the total cell catalyst loading may be less than about 0.15 milligrams of the platinum particles per $cm^2$ of the surface area of either one of the electrodes. Thus, the new membrane electrode assembly of the invention provides relatively high power output with unexpectedly low catalyst loading.

As described above, the anode side has a design different from the cathode side and different from conventional anode design as described in the '017 patent. FIG. 4 shows a magnified view of a portion of a porous gas diffusion electrode according to the '017 invention. Carbon particles 60 are provided to support catalyst particles 62 preferably of platinum, which are preferably supported on internal and external surfaces of the carbon particles 60. In this configuration catalytic particles are disbursed throughout the thickness of the electrode. In contrast, the electrode of the invention (FIG. 5) has catalytic electrode material on the surface of the proton and electron-conductive layer of the electrode.

EXAMPLE

In this example, a membrane electrode assembly (MEA) 12 was made. The cathode was made by conventional means and the anode electrode was made by the improved method of the invention. In both cases carbon paper was used for the current collector and supported the active material components of the electrode. In this example both Nafion® and Teflon® are used. Nafion® membrane and Nafion® solution were obtained from Dupont and Solution Technology, respectively. Nafion® is a registered trademark of DuPont. Teflon® is also a trademark of Dupont.

Carbon paper from SpectraCorp Inc. in the USA, was used for the current collector. The carbon paper was 11 mil. (about 280 microns) thick with a density of 0.36 gm/cc. This paper had dimensions of 5 cm×5 cm for making a 25 $cm^2$ area electrode. It was coated with Teflon® by dipping in a 4% Teflon® solution. The paper was air dried for 2 minutes, baked at 100° C. for 10 minutes, heat treated at 320° C. for 15 minutes, and finally sintered at 380° C. for 15 minutes. Sintering is done to achieve good adherence of the Teflon® to the carbon paper. It should be noted that carbon paper is also referred to as graphite paper, sheets or grid, and is porous for use in gas diffusion electrodes. The Teflon® uptake on the top and the bottom of the paper was analyzed using X-ray fluorescence. The Teflon® loading was calculated to be 7.25% at the top and 5% at the bottom. The top side was used to coat the electrode.

Figure 6:
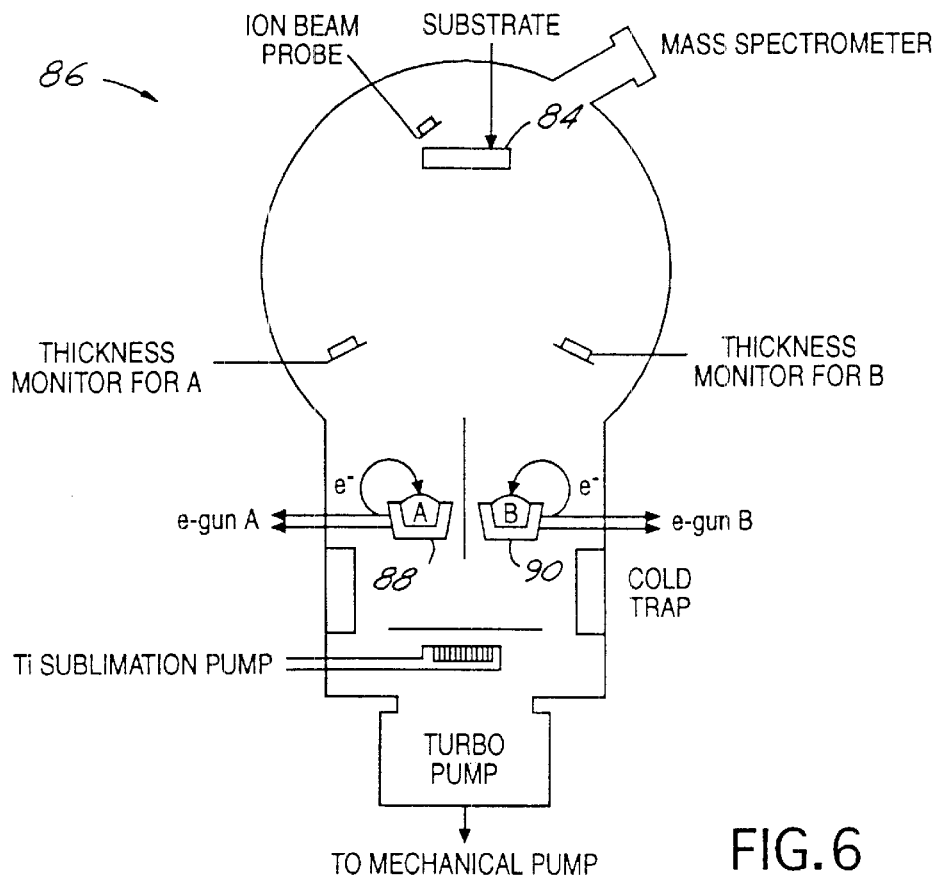
FIG. 6 is a schematic of an experimental electron-beam system for physical vapor deposition of catalyst onto an electrode.

The process for forming the negative electrode (hydrogen anode) will now be described. Acetylene Black, electrically conductive carbon particles (in powder form) were obtained from Alfa Aesar, Inc. The acetylene black carbon particles had physical features as described in Table I of U.S. Pat. No. 5,272,017. The particles had a mean particle size of 42.5 nm (nanometers) with a 25 nm standard deviation, as received. The carbon powder was mixed with 5% Nafion® solution obtained from Solution Technology, Inc. They were mixed ultrasonically and the slurry obtained was applied to the Teflon® loaded top side, of the carbon sheet. The carbon powder/Nafion® ratio was 60/40 by dry weight. The electrode was dried at 100° C. for 30 minutes. After drying, the electrode sample 84 was placed into the loadlock of a ultrahigh vacuum electron-beam evaporation chamber. After the loadlock pressure reached $10^{-7}$ torr, the sample was transferred to the main deposition chamber 86 (FIG. 6). The base pressure of the chamber was $5.5 \times 10^{-9}$ torr. A crucible 88 in the chamber held the Pt to be deposited. If the Pt is to be co-deposited with a second metal, the second metal is held by a second crucible 90. A beam of electrons was used to melt and evaporate the Pt. Platinum (Pt) was vapor deposited on the electrode 84 at a rate of 0.05 nanometers per second (nm/s) using electron-beam evaporation. The rate of this physical vapor deposition (PVD) was monitored by a quartz crystal microbalance and was calibrated using electron probe microanalysis (EPMA). Here, the quartz of the microbalance had a resonance frequency that shifted in response to the weight of Pt added. The deposition temperature was about 25 to 30° C. This represents the temperature of the electrode surface upon which the Pt was deposited. The surface was at about ambient (room) temperature. The temperature changed very little during the deposition process. In several cases, Pt was also deposited simultaneously on atomically flat single crystals of silicon and the amount of Pt was verified using EPMA. The thickness of this assembled anode was determined by transmission electron microscopy (TEM) to be about 10 to 13 microns ($\mu$m). Several electrodes having various Pt loadings were made by the process of this example. The Pt loadings were 0.007 mg/$cm^2$, 0.015 mg/$cm^2$, 0.03 mg/$cm^2$, and 0.07 mg/$cm^2$.

The process for forming the positive electrode (air cathode) utilized previously catalyzed carbon particles. In this process, platinized carbon and Nafion® solution were mixed in an amount that provided an equivalent dry weight ratio of catalyzed (platinized) carbon to Nafion® of about 70/30. The mixture of catalyzed carbon and Nafion® in solution was applied to the carbon paper current collector and dried. The Pt loading of the electrode was about 0.265 mg/$cm^2$ to about 0.320 mg/$cm^2$. The catalyzed carbon particles were substantially platinized Vulcan as described in U.S. Pat. No. 5,272,017. The characteristics of a variety of carbon particles useable as catalyst supports are described in Table I of U.S. Pat. No. 5,272,017. Thickness of this assembled cathode was found to be 50 microns by transmission electron microscopy.

Figure 3:
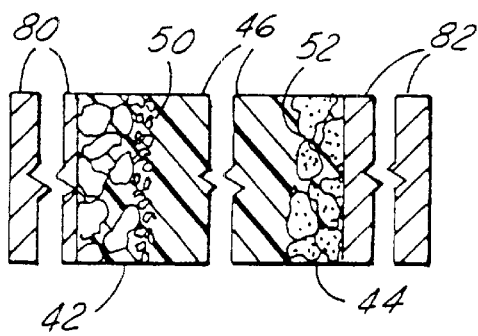
FIG. 3 is a pictorial illustration of a membrane electrode assembly as in FIG. 2, and having graphite sheets.

The hydrogen anode and air cathode were then hot pressed to a Nafion® 112 membrane at about 500 lbs/$inch^2$ compressive load for about 1 to 1.5 minutes at 300° F., to form the membrane and electrode assembly (MEA) (FIG. 3). The Nafion® 112 membrane had the features as described above, and a thickness of about 50 microns. The entire assembly had an overall thickness of about 660 to 665 microns. The deposited Pt at the anode surface is localized to within less than a micron from the Nafion® 112 membrane surface. During hot-pressing, some of the Pt is pressed into the heat-softened membrane. The membrane adheres to the deposited Pt at the surface.

Characterization/Results

The amount of Teflon® applied to the Spectracorp carbon sheet was determined experimentally by measuring the weight gain. These values were confirmed by X-ray fluorescence and were in good agreement. The distribution and amount of Pt deposited on the electrode in the vacuum chamber were studied using EPMA, electron probe microanalysis. The Pt particle size was estimated by x-ray diffraction and using Scherrer equation. Pt particle sizes were estimated to be 8 nm for the e-beam evaporated anode and 4 nm for the chemically coated cathode.

Figure 7:
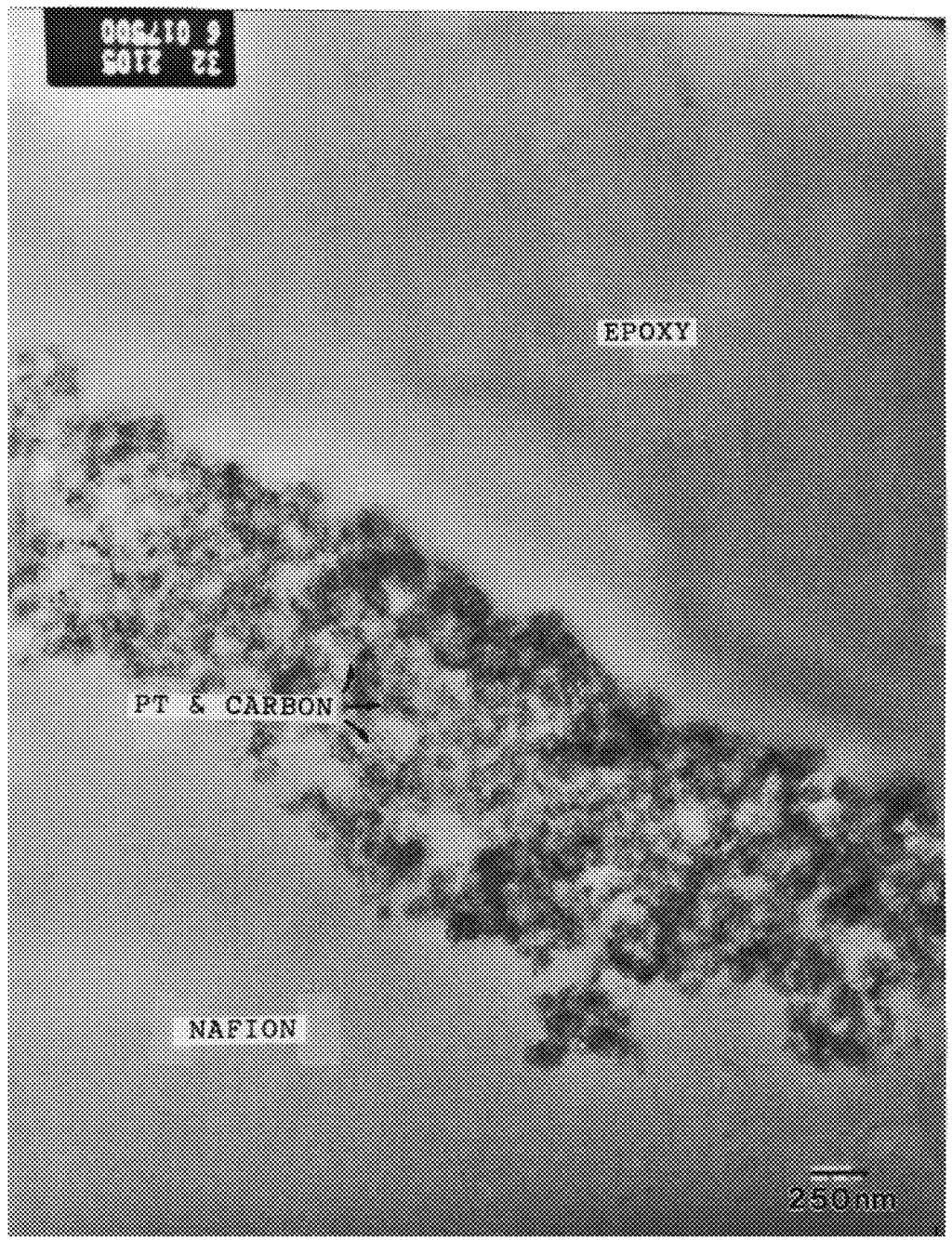
FIG. 7 is a transmission electron micrograph of the cathode showing dispersion of Pt catalyst throughout the electrode active material layer.

Transmission electron microscopy (TEM) revealed that the chemically deposited cathode had Pt particles uniformly dispersed throughout the carbon coating. Pt particles were equiaxial single crystals with particle diameters ranging from 1.5–5 nm (FIG. 7). The diffraction pattern (not shown) was a diffuse ring indicating smaller Pt grains. In contrast, Pt deposited on the anode by PVD was a highly discontinuous film (FIG. 8) at the AB carbon/Nafion® membrane interface. The discontinuous Pt film had particles in the form of flakes or platelets, about 100–200 nm long and 10–40 nm thick. Pt particles were polycrystalline and had a sharper electron diffraction pattern (not shown) which indicated a larger grain (particle) size.

The MEA was placed in a graphite cell (Electrochem Inc.). The graphite plates have flow-fields to assist a uniform distribution of the reactant gases. The active area of the MEA was 25 $cm^2$ (5 cm×5 cm). The cell was tested using a fuel cell test stand station from GlobeTech, GT 120. Both hydrogen and air were humidified and the gases were flowed at 1.4/2.5 ($H_2$/Air) stoichiometry. The MEA cell was operated at 80° C. with a backpressure of 25 psig applied to both the electrodes. The MEA cell was tested under these conditions for 24 hours, and the cell voltage and current density were recorded. To measure the cell performance, the cell voltage was scanned between open circuit voltage, about 0.9–1.0 V, to 0.0 V at a scan rate of 5 mV/sec. The above-mentioned stoichiometric ratio (1.4$H_2$/2.5Air) can be further understood in terms of utilization. The amount of gas (number of moles) supplied in would be equal to the amount of gas coming out, when the fuel cell is not in operation. During operation, it is observed that the amount of gas coming out is less than the gas going in because the reactant utilization in the cell is always less than unity due to various considerations. In order to maintain the desired reaction kinetics more gas is supplied than what is utilized in the reaction. Utilization would be ($[H_2,in]-[H_2,out])/[H_2in]$. Therefore, stoichiometry would be stoichiometry=1/utilization. For example, the utilization of $H_2$ is 0.71 mole when 1 mole is passed in so, stoichiometry equals 1/.71 which equals 1.4 $H_2$.

Figure 9:
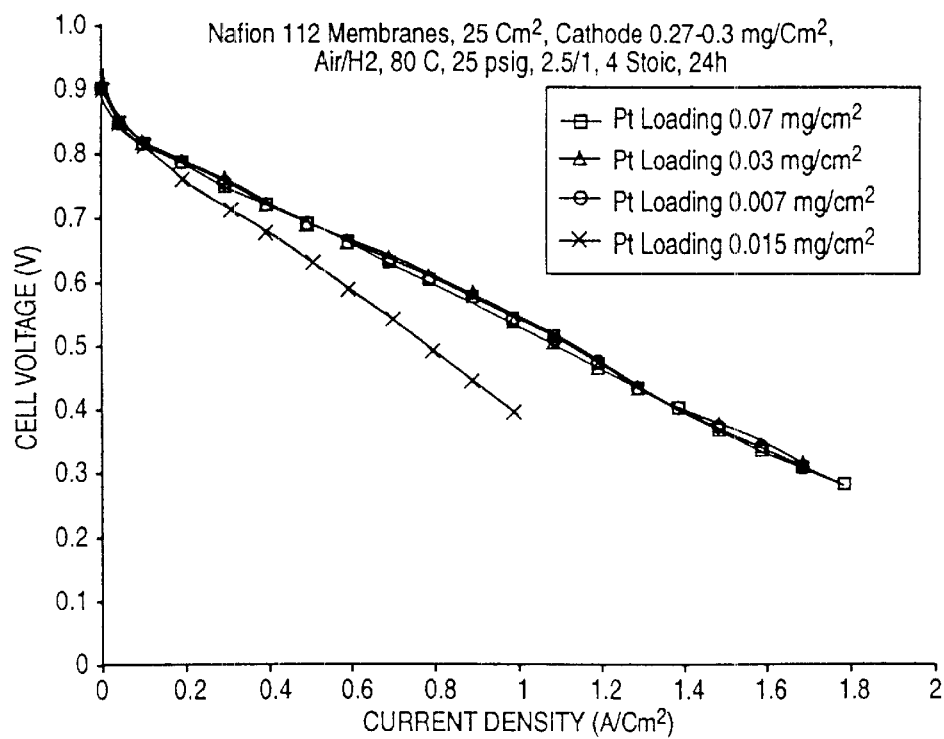
FIG. 9 is a graph showing results of cell performance after 24 hours of use. There are four levels of Pt for which cell voltage versus current density is shown.

The current-voltage curves were recorded using an IBM-PC/XT based data acquisition system, which included a GPIB-PCIIA interface card and Data-Acquisition software from Globe Tech (Keithley DASCON-1). The software package set the system parameters, the test sequence for data acquisition, and plotting of the acquired data. A Current-Voltage curve obtained with ultra-low loaded Pt anodes is shown in FIG. 9. It clearly showed that the approach had been successful in reducing Pt loadings to 0.015 mg/$cm^2$ at the anode without any sacrifice in performance, as compared to the loadings of 0.03 mg/$cm^2$ and 0.07 mg/$cm^2$.

This technology performed well in laboratory scale with $H_2$/air. A similar decrease in Pt loading is thought to be possible at the cathode. There are added considerations for cathode optimization because the rate parameters for $O_2$ reduction are several orders of magnitude lower than that of the hydrogen oxidation reaction. Also, the air electrode structure must possess suitable hydrophobicity for optimum water management.

Comparative Example

The process for forming the conventional, comparative, negative electrode was essentially the same as described earlier for the positive electrode. The process for forming the comparative negative electrode utilized previously catalyzed carbon particles. In this process, platinized carbon and Nafion® solution were mixed in an amount that provided an equivalent dry weight ratio of catalyzed (platinized) carbon to Nafion® of about 70/30. The mixture of catalyzed carbon and Nafion® in solution was applied to the carbon paper current collector and dried. The Pt loading of the electrode was about 0.3 mg/$cm^2$. The catalyzed carbon particles were substantially platinized type carbon as described in U.S. Pat. No. 5,272,017. The characteristics of a variety of carbon particles useable as catalyst supports are described in Table I of U.S. Pat. No. 5,272,017. Thickness of this anode was found to be about 50 microns by transmission electron microscopy.

This comparative negative electrode and the air cathode as described in the above Example, were hot-pressed to a Nafion® 112 membrane at about 500 lbs/$inch^2$ compressive load for about 1 to 1.5 minutes at 300° F., to form a membrane and electrode assembly (MEA).

TABLE 1

H2/Air Cell Performance at 0.6 V, 80° C., 25 psig

| Pt Loading (mg/$cm^2$) | Current Density (mA/$cm^2$) |
|---|---|
| 0.3 (Comparative Example) | 850–900 |
| 0.07 (PVD Example) | 820–850 |
| 0.03 (PVD Example) | 820–850 |
| 0.007 (PVD Example) | 590–610 |

Table 1 shows performance results achieved by the physical vapor deposition (PVD) method of the invention for preparing anodes as compared to the Comparative Example chemical precipitation method for forming anodes. In conventional chemical precipitation methods very fine particles of catalysts are deposited onto fine carbon particles. This is as described in U.S. Pat. Nos. 5,272,017 and 5,316,871. The amount of platinum commonly used in conventional electrodes is in a range of 0.3 to 3 mg/$cm^2$ per cell, which is too costly. The PVD approach as shown in Table 1 provides performance equivalent to that of the more costly high Pt loading electrodes. At the same time, the PVD approach provides Pt loading an order of magnitude less than the conventional electrodes. Therefore, the Pt loadings have been lowered by at least a factor of 10 at the hydrogen anode without any appreciable decrease in the performance of the fuel cell as demonstrated by the data in Table 1.

The invention provides significantly increased catalyst utilization and dramatic reduction of catalyst loadings in PEM fuel cells. This is accomplished by localizing the catalyst layer in a thin layer adjacent to the membrane/electrode interface. This provides the ultra-low platinum loadings of less than about 0.10 mg/$cm^2$/cell which is needed to demonstrate commercial viability of PEM fuel cells for transportation applications. The Pt particles deposited by the process of the invention are localized at the electrode/Nafion® membrane interface, thus providing effective utilization of the Pt particles. The method of the invention also conveniently provides direct deposition of Pt on the electrode surface. This is accomplished in one embodiment by physical vapor deposition (PVD), although other deposition means are useable. The PVD process of the invention comprises evaporating source materials in a vacuum chamber below about $1\times10^{-6}$ torr and condensing the evaporated particles on the substrate. The vacuum condition provides deposition in a very, very clean environment. It is thought that for commercial use, a vacuum on the order of only $10^{-5}$ torr would be adequate and provide an adequately clean environment for deposition. The degree of vacuum for platinum deposition is not thought to be crucial because platinum is relatively inert and would not oxidize in the presence of air. Therefore, although sub-atmospheric conditions are preferred for deposition, the choice of metal will dictate the condition. Other metals such as titanium are known to react with oxygen. In this case, the vacuum within the chamber must be adequate to prevent the oxidation of titanium in the system before the titanium travels from the deposition source to the substrate. It is also possible, by the method of the invention, to co-deposit two or more metals.

Because of the hot-pressing that occurs, the membrane melts and therefore adheres very directly to the platinum particles. The platinum is on the order of about 9 to about 30 nanometers from the Nafion® membrane at the membrane/electrode interface. The deposited platinum forms aggregates of platinum particles or polycrystals. In one analysis taken along one direction, they appeared as flakes or platelets having a relatively long axis relative to its width and some minimal thickness. Importantly, the deposited platinum is dispersed or discontinuous. The deposited platinum does not form a continuous film. Rather, clusters of platinum atoms are formed. Therefore, the aggregates of Pt particles form regions; within a given region, the aggregate of several platinum particles may be continuous. The deposited platinum is a crystal, and the invention may be thought of as aggregates of platinum crystals of very small size.

Figure 8:
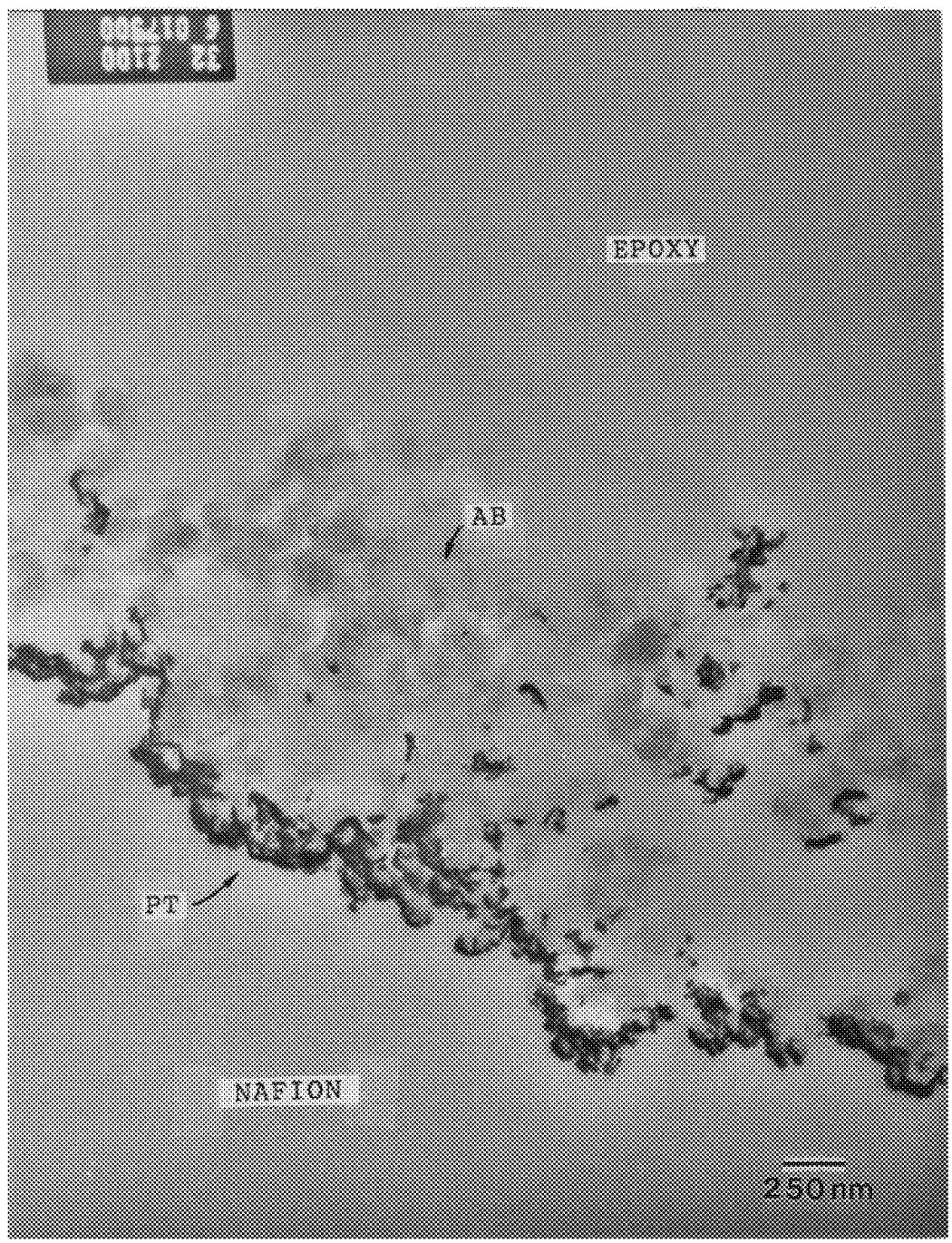
FIG. 8 is a transmission electron micrograph of the anode showing the localization of Pt catalyst particles at the interface with the electrolyte Nafion® membrane.

When comparing the anode prepared by the method of the invention (FIG. 8) with the cathode prepared by conventional means (FIG. 7), it can be clearly seen that the PVD Pt layer is highly localized at the membrane/carbon boundary. In contrast, the cathode having the catalyzed carbon particles shows less localization of the catalyst. By the method of the invention, it is possible to localize essentially all of the catalytic particles within about 0.5 microns of the membrane/electrode interface (FIG. 8). This is in significant contrast to conventional electrodes where the catalyst is distributed essentially throughout the cathode active material layer (FIG. 7). It is clearly evident that the PVD electrodes with Pt loadings as low as 0.015 mg/cm$^2$ are found to show similar performance to electrodes with 0.3 mg/cm$^2$ prepared by conventional methods. As per the invention, the platinum catalyst particles are selectively arranged in areas of ionic and electronic conductivity. The advantage provided by the present invention is clear and dramatic.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method of making an electrode structure comprising the steps of:
   a. providing a current collector sheet;
   b. forming a mixture comprising proton conductive material and carbon particles;
   c. applying the mixture onto the current collector sheet and forming a film from the mixture, the film having first and second surfaces with the first surface adhered to the sheet; and then
   d. generating a flux of metal atoms and collecting the atoms on the second surface of the film to form dispersed metallic polycrystals on the second surface of the film, wherein the flux of metal atoms is generated by physical vapor deposition, the physical vapor deposition occurring in a manner which maintains physical characteristics of the metal atoms throughout generation and collection.

2. The method of claim 1 wherein said flux of metal atoms generated by physical vapor deposition occurs by a process selected from the group consisting of electron beam evaporation, sputtering, and plasma-assisted evaporation.

3. The method of claim 1 wherein the mixture of step (b) further comprises a solvent, and step (c) further comprises removing the solvent from the applied mixture thereby forming the film adhered to the sheet.

4. A method of making a combination electrolyte and electrode structure for an electrochemical cell having an electrolyte membrane of solid polymer proton conductive material with first and second spaced apart opposed surfaces and an anode electrode at the first surface and a cathode electrode at the second surface, the method comprising the steps of:
   a. providing an anode current collector sheet;
   b. forming a mixture comprising proton conductive material and carbon particles;
   c. applying the mixture onto the anode current collector sheet and forming a film from the mixture, the film having first and second surfaces with the first surface adhered to the sheet;
   d. generating a flux of metal atoms and collecting the atoms on the second surface of the film to form dispersed metallic polycrystals on the second surface of the film to thereby form the anode electrode, wherein the flux of metal atoms is generated by physical vapor deposition, the physical vapor deposition capable of maintaining physical characteristics of the metal atoms throughout generation and decomposition;
   e. providing a cathode electrode comprising a cathode current collector sheet and electrode active material comprising catalyzed carbon supported on said cathode current collector sheet;
   f. placing the anode electrode on the first surface of the membrane with the second surface of the film facing the membrane first surface;
   g. placing the cathode electrode on the second surface of the membrane with the electrode active material facing the membrane second surface;
   h. heating while pressing the anode and cathode electrodes to the respective surfaces of the membrane for a time and at a temperature and compressive load sufficient to adhere the electrodes to the membrane.

5. The method of claim 4 wherein the temperature and compressive load are sufficient to localize the dispersed metallic polycrystals of the anode at a location between the membrane and the anode current collector sheet.

6. The method of claim 5 wherein the time is in a range of about one to about five minutes.

7. The method of claim 4 wherein the compressive load is in a range of about 250 to about 1000 pounds per square inch.

8. The method of claim 4 wherein the temperature is in a range of about 280° F. to about 320° F.

9. A combination electrolyte and electrode structure for an electrochemical cell, comprising: a proton conductive polymer electrolyte membrane having first and second spaced apart opposed surfaces and an intermediate region; first and second electrodes each adhered to a respective one of the first and second surfaces of the membrane; at least one of said electrodes having a film which comprises carbon particles dispersed in a proton conductive material and metallic polycrystals on the film facing the first surface of the membrane, at least a portion of the metallic polycrystals being at least partially embedded in the first surface of the membrane, where the metallic polycrystals comprise at least one metal and the amount of polycrystals provides a metal loading between about 0.015 and about 0.1 mg per square centimeter of electrode surface area and wherein the metal in the metal polycrystals is localized proximate to the membrane/electrode interface; and wherein the metallic polycrystals are finely divided aggregates forming flakes or platelets.

10. A combination electrolyte and electrode structure for an electrochemical cell, comprising: a proton conductive polymer electrolyte membrane having first and second spaced apart opposed surfaces and an intermediate region; first and second electrodes each adhered to a respective one of the first and second surfaces of the membrane; at least one of said electrodes having a film which comprises carbon particles dispersed in a proton conductive material and metallic polycrystals on the film facing the first surface of the membrane, at least a portion of the metallic polycrystals being at least partially embedded in the first surface of the membrane, where the metallic polycrystals comprise at least one metal and the amount of polycrystals provides a metal loading between about 0.015 and about 0.1 mg per square centimeter of electrode surface area and wherein the metal in the metal polycrystals is localized proximate to the membrane/electrode interface; and wherein the structure further comprises a current collector facing said one electrode which is composed of a graphite sheet coated with an aqueous slurry of tetrafluoroethylene and sintered to provide a tetrafluoroethylene content of about 5% to about 7% by weight.

11. A combination electrolyte and electrode structure for an electrochemical cell, comprising: a proton conductive polymer electrolyte membrane having first and second spaced apart opposed surfaces and an intermediate region; first and second electrodes each adhered to respective one of the first and second surfaces of the membrane; at least one of said electrodes comprising a first layer facing said membrane wherein said first layer comprises carbon particles dispersed in a proton conductive material, and a second layer between the membrane and the first layer, said second layer comprising metallic polycrystals contracting the first surface of the membrane, at least a portion of the metallic polycrystals being at least partially embedded in the first surface of the membrane.

12. The structure of claim 11 wherein the carbon particles are finely divided particles having a mean particle size in a range of about 35 to about 50 nanometers.

13. The structure of claim 11 wherein the metal in the metal polycrystals is selected from the group consisting of platinum, palladium, titanium, ruthenium, rhodium, tungsten, tin, molybdenum, and mixtures thereof.

\* \* \* \* \*